June 23, 1970  E. J. SEDLOCK ET AL  3,517,239

HIGH SPEED COMMUTATOR AND BRUSH ASSEMBLY

Filed Aug. 31, 1966  2 Sheets-Sheet 2

United States Patent Office 3,517,239
Patented June 23, 1970

3,517,239
HIGH SPEED COMMUTATOR AND
BRUSH ASSEMBLY
Edward J. Sedlock, Wapping, Conn., and Charles F.
Paquette, Springfield, Mass., assignors to United
Aircraft Corporation, East Hartford, Conn., a corporation of Delaware
Filed Aug. 31, 1966, Ser. No. 576,309
Int. Cl. H02k, 13/04
U.S. Cl. 310—237                    13 Claims

ABSTRACT OF THE DISCLOSURE

A face-plate commutator assembly and associated fluid loaded and cooled brushes are disclosed. The commutator is characterized by allowance for radial expansion of the individual segments while the brushes are characterized by internal and external cooling passages and contacting surfaces of shape commensurate with commutator segment shape.

This invention relates to the establishment of conductive paths to the rotating part of an electrical machine. More particularly, the present invention is directed to the commutation of direct currents induced in or supplied to the rotor of a high speed electrical machine. Accordingly, the general objects of the present invention are to provide new and improved methods and apparatus of such character.

The use of gas turbine engines to drive electric generators, particularly to supply peak load period power demands and for rapid start up generators to combat emergency situations, is gaining rapidly. The conventional gas turbine is, of course, a high speed device. That is, the rotational speeds of a conventional gas turbine engine may be in the range of 4,500 to 9,000 r.p.m. The conventional electric generator is a low speed device and thus a coupling problem exists. In the typical present installation, a free turbine engine comprising a gas generator driving a free turbine is employed. The free turbine, which is also normally a high speed device, is coupled to the electrical machine. To eliminate the aforementioned coupling problem, either the speed of the free turbine must be reduced by gearing, which adds weight and cost, or a massive and costly (slow speed) free turbine must be utilized. It has long been a desire to develop high speed generators that could be directly coupled to the turbine shaft of the gas generator thus eliminating the need for speed reduction means or free turbines. Such an arrangement, since it eliminates both the gearing and the free turbine, would have the added advantage of permitting the generator and gas turbine engine to be of approximately the same size and weight thus facilitating their mating and alignment. However, the aforementioned desirable attributes can be achieved only through the design of a compact, high speed electric generator.

The electric machine, be it motor or generator, must be provided with means for establishing a path for electrical energy from stationary equipment to the rotating part of the machine. In the case of the direct current machine, this function is accomplished by the commutation system which comprises a rotating, segmented commutator against which a plurality of stationary brushes rub. Commutator-brush assemblies are, of course, well known in the art. However, it has been found that the prior art commutation schemes have one or more inherent characteristics which prevent their proper and efficient functioning at high speeds. Broadly, the deficiencies of the prior art commutation schemes which make themselves apparent at high speeds may be classified as commutator distortion and brush bounce. The typical prior art commutator comprises segments which are placed about the outer diameter of a drum and retained in place by engagement with insulated dovetail slots. At high rotational speeds, centrifugal forces tend to pull the commutator apart. That is, at high speeds the insulation in the dovetail slots gives, the segments are forced outwardly and the commutator surface is no longer smooth and round. This out-of-roundness results in "high bars" which in turn causes bouncing of the brushes with excessive sparking. The high bars also rapidly erode the brushes. Also at high speeds, and particularly in the environment of a gas turbine driven generator, comparatively high operating temperatures, due both to friction and the operating environment, cause thermal expansion of the commutator segments which further serves to distort or pull the commutator apart. The closely allied problem of brush bounce, mentioned briefly above; which results in inefficient operation, arcing and short brush life; results from both thermal and centrifugal induced distortion of the commutator surface. Brush bounce is also a result of an inability, due to the construction of prior art commutators, to machine the face (rubbing surface) of the commutator smooth thus eliminating irregularities which cause bounce.

The present invention overcomes the aforementioned deficiencies of the prior art by providing a commutation scheme particularly well suited for employment with a high speed, direct current machine.

It is therefore an object of this invention to establish a conductive path between rotating and stationary elements of a direct current machine.

It is another object of the present invention to provide commutation for a high speed, direct current machine.

It is yet another object of the present invention to provide a commutator having a surface which will not distort under the influence of high rotational speeds.

It is also an object of the present invention to provide a commutator having a surface which is free from thermal expansion induced distortions.

It is a further object of the present invention to provide a commutator which may be machined to provide a smooth brush contacting surface.

It is still another object of the present invention to provide a commutation system for a high speed, direct current machine employing a highly efficient commutator-brush arrangement.

It is another object of the present invention to provide a commutation system for a high speed, direct current machine wherein the brush assemblies are fluid cooled.

These and other objects of the present invention are achieved by use of a face-plate type commutator having a plurality of wedge-shaped segments which define an annulus. Due to their novel configuration and mode of securement to the rotor of the machine, the inner ends of the segments are securely affixed to the machine. The outer ends of the segments are restrained from axial movement but, due to the novel mode of their support from the rotor of the machine, radial expansion of the segments caused by thermal expansion or centrifugal forces is permitted. The face of the commutator is contacted by fluid loaded brushes, the contacting surfaces of which are commensurate in shape to the shape of the individual commutator segments. The brushes are formed so as to permit cooling fluid to flow therein and, in combination with the brush housings, to define additional passages for the flow of cooling fluid about the exterior of the brushes. The brushes and their holders also cooperate to provide an assembly wherein brush rotation may not occur.

This invention may be better understood and its various advantages will become apparent to those skilled in the art by reference to the accompanying drawing wherein like reference numerals refer to like elements in the various figures and in which.

Figure 1:
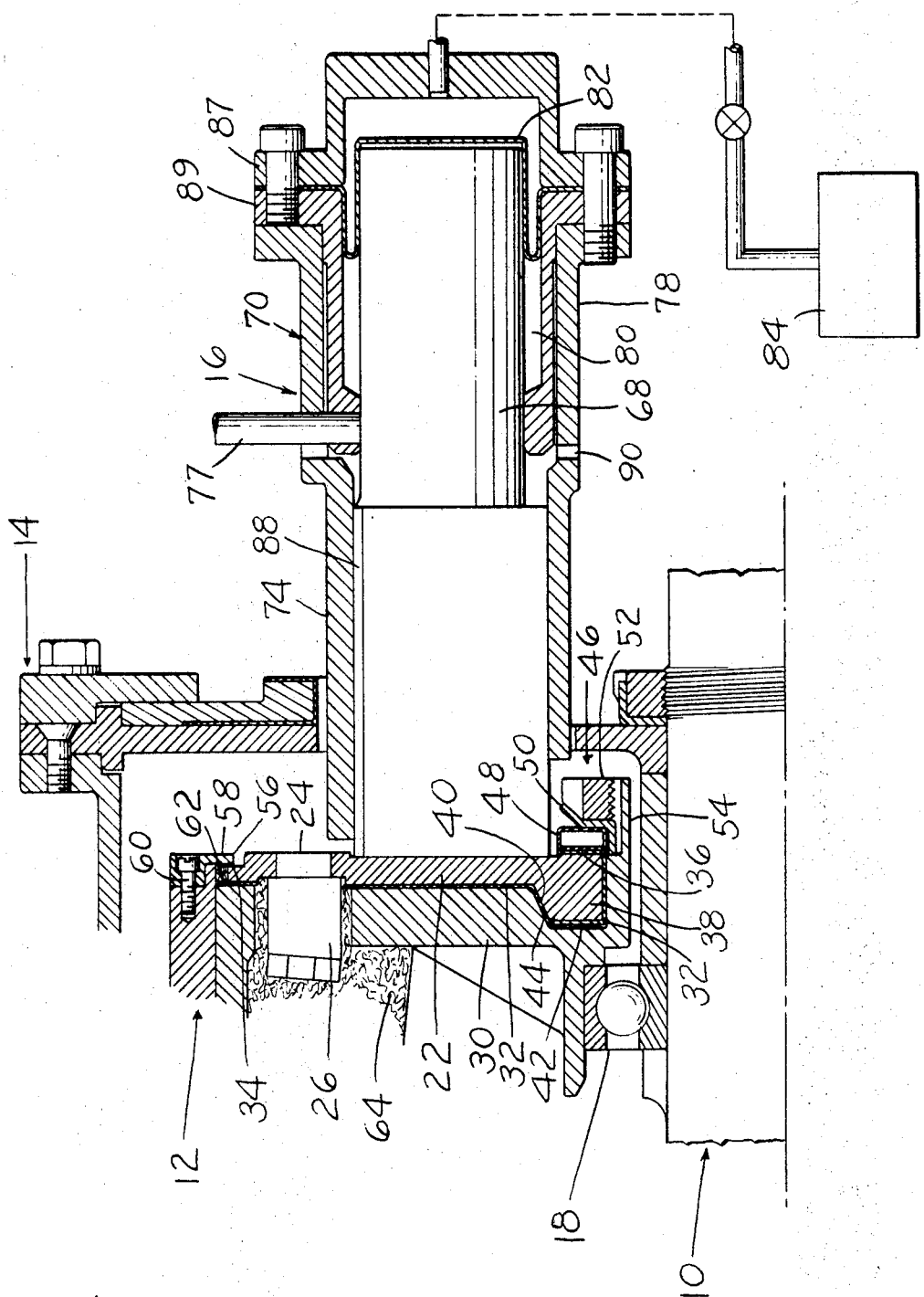
FIG. 1 is a partial cross sectional view of a first embodiment of the commutator-brush assembly which comprises the present invention.

While not limited thereto in its utility, the present invention is particularly adaptable to and thus will be described in connection with an "inside out" direct current generator. Briefly, an "inside out" direct current generator is an apparatus wherein an outer rotor carrying armature coils rotates about a stator having field poles thereon. The commutator must, of course, provide electrical communication between the rotating armature and the outside world. As shown in FIG. 1, the stator is indicated generally at 10, the rotor generally at 12, the stationary motor housing at 14 and a brush and brush holder assembly at 16. Rotor 12 is coupled directly to the shaft of a turbine of a gas generator, not shown, and rotates at a high speed about stator 10 on bearing 18.

Figure 2:
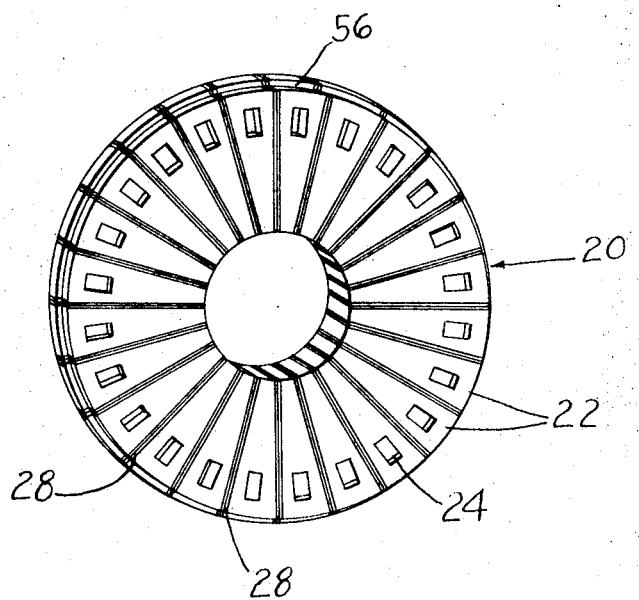
FIG. 2 is a perspective view of the commutator shown in cross section in FIG. 1.

A commutator 20, which may best be seen from FIG. 2, is mounted on rotor 12 in the manner to be described below. Commutator 20 comprises a plurality of wedge shaped commutator segments 22, one of which is shown in cross section in FIG. 1. The commutator segments are each provided with an aperture 24 therein. The ends of the armature conductors, one of which is shown at 26, are soldered or brazed into apertures 24. The commutator segments are, of course, insulated from each other. This insulation is provided by thin mica spacers 28 which are positioned between each of segments 22 and which have the same cross-sectional shape as the segments. The commutator segments are also insulated from the armature housing (commutator support portion 30 of rotor 12) by means of a mica insulator 32 which is formed to the shape of the exposed end of support portion 30. Mica rings 34 and 36 provide insulation between the outer faces of the commutator segments and the means for retaining the segments in position against the armature housing.

As may best be seen from FIG. 1, each of wedge shaped commutator segments 22 has a foot 38 which extends outwardly from the rear side of the segment (i.e. the side which will not contact the brushes). Each of feet 38 has an outwardly extending sloped or wedging surface 40. Commutator support portion 30 of rotor 12 is provided with an annular groove 42 which is commensurate in shape with the shape of feet 38 on the commutator segments. Thus, annular groove 42 has an outwardly extending conical support surface 44 which is complementary in shape to wedging surface 40 on feet 38 of the commutator segments. Thus, when the commutator segments are inserted in groove 42 of support member 30, surfaces 40 and 44 cooperate to urge the segments radially inward toward the axis of rotation of the rotor and axially inward tightly against the armature housing. This wedging action is produced by and the segments are secured at their inner ends by a securing means, indicated generally at 46, which comprises an insulated spacer ring 48, a lockwasher 50 and a threaded retaining ring 52. Retaining ring 52 engages threads on a flange 54 which extends from armature housing 30. When retaining ring 52 is tightened, insulated spacer ring 48 urges the commutator segments tightly into annular groove 42. Securing means 46 thus prevents axial movement of feet 38 of commutator segments 22 and the complementary surfaces 40 and 42 prevent radial motion of the commutator segments. Adjacent to their outer edges, the commutator segments 22 are provided with a portion or lip 56 of decreased thickness. An annular retaining plate 58 extends part way over lip 56 and thus prevents axial movement of the outer ends of the commutator segments. As noted above, the segments are insulated from retaining plate 58 by means of mica ring 34. Retaining plate 58 is provided with a plurality of holes through which a plurality of bolts 60 pass. The armature housing of rotor 12 is provided with threaded holes for receiving bolts 60. The holes in retaining plate 58 are of suitable shape to permit recessing of the heads of bolts 60. While not absolutely necessary, it has been found desirable to have the outer surface of retaining plate 58 and the head of bolt 60 in or recessed below the plane defined by the surface of commutator 20. The elimination of projecting edges obviates the problem of a build up of carbon particles or dust worn off the brushes, such a build up in time causing shorting of the individual commutator segments 22.

Since as mentioned above, it is necessary that the individual commutator segments be able to expand radially, the space between the outer ends of the segments 22 and retaining plate 58 is filled with an insulating material 62 having some resiliency. In a preferred embodiment, insulating material 62 comprises Fiberglas. In operation, should expansion of the commutator segments occur, for example due to high operating temperatures, the segments 22 will be able to expand radially outward sliding under retaining plate 58 and compressing insulating material 62. However, such thermal expansion of the commutator segments, since the segments are free to move radially, will not cause buckling or distortion of the face of the commutator. It should also be noted that the space immediately surrounding the armature conductors 26 is packed with Fiberglas material 64 thus also facilitating radial expansion of the segments 22. It should also be noted that the centrifugal induced "high bars" is not a problem since the brush contacting surface of the commutators of the present invention is at the face rather than the outer surface of the commutator.

In the usual instance, the brush and brush holder assembly 16 comprises four brush holders mounted on a brush positioner, not shown. Typically, the brush positioner is adjustable such that the individual brush holders are adjustable with relation to the magnetic field. Each of the brush holders supports a brush 68 such that its axis is perpendicular to the surface of the commutator 22. The brush holders are insulated from the stator 10 and motor housing 14 by means of rings of insulating material which are located under the mounting flanges, not shown, of the brush holder 70. In cross-section, the front portion 72 of each of the brushes and the shape of the front portion 74 of brush holder 70 are, with the exception to be discussed below, complementary. Accordingly, the brush is supported by the brush holder and, since both the brush holder and brush have corners, rotation of the brushes will not occur and vibration and chatter of the brushes is eliminated. The brushes have a wedge shaped face commensurate with the shape of the commutator segments. Accordingly, the arrangement of the present invention results in increased commutation efficiency since, when compared to the prior art conventionally shaped brushes, there is a larger area of contact between the brushes and the commutator segments to either side of the sector of the commutator which at any instant is in contact with the brush. Electrical contact to the brushes is via a conductor 77.

The rear portion 76 of each of the brushes 68 is of cylindrical shape. Portion 76 of the brushes extends into a rear portion 78 of the brush holder which is of larger diameter than portion 76 of the brush. Accordingly, a clearance 80 is provided between the rear portion 78 of the holder and the rear portion 76 of the brush. Positioned against the end of the brush is a flexible diaphragm 82. The outer edge of diaphragm 82 is held between diaphragm clamping flanges 87 and 89 of the brush housing and the diaphragm is folded into the clearance between the brush and brush holder as shown. The end 76 of the brush is thus enveloped by the flexible diaphragm 82 and supported by the forward portion or clamping flange 89. The diaphragm, being commensurate in shape with the cross sectional area of the rear portion 78 of the holder 70, and being clamped at the sides of the brush holder as shown, divides the rear portion of the brush holder assembly into separate compartments along the rear of brush 68. Air or other suitable fluid from a pressurized source, shown schematically at 84, is supplied to the interior of the brush holder assembly to the rear of diaphragm 82. The pressurized fluid acts on diaphragm 82 to load the brush against the commutator. The above described fluid loading arrangement has numerous advantages. For example, the loading force on the brush does not decrease as the brush wears if the pressure supplied by source 84 is held constant. Also, the gas or fluid acts to dampen brush vibrations. Further, longer brush life is realized since heat is transferred through the diaphragm to the fluid which, if desired, may be continuously circulating.

Figure 3:
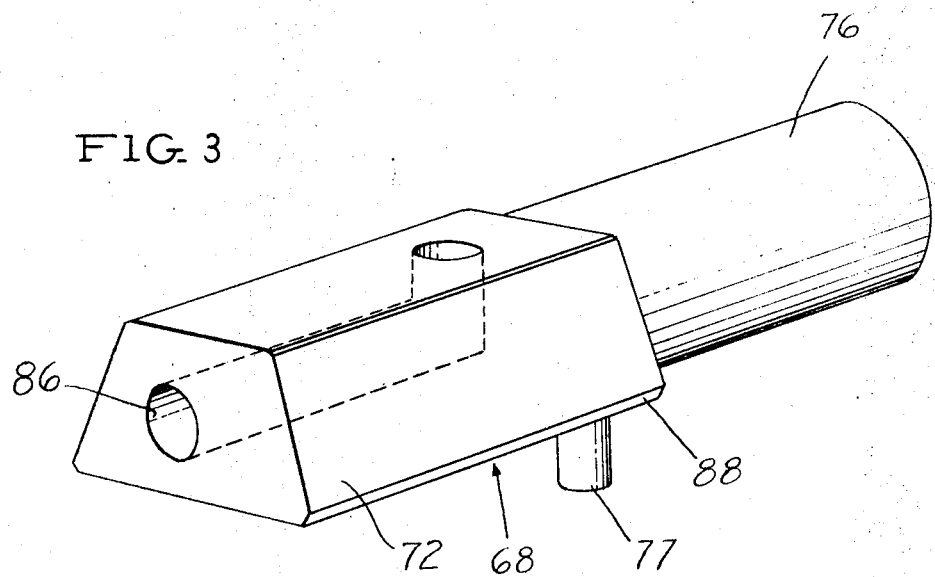
FIG. 3 is a perspective view of the brush shown in cross section in FIG. 1.

In regard to cooling of the brushes, as may best be seen from FIG. 3, a front portion 72 of the brushes may be provided with a fluid supply passageway 86 through which a cooling fluid, preferably air or nitrogen, is pumped from a source, not shown. Also, the upper corners of the wedge-shaped portion 72 of the brush are cut away as shown at 88 to provide additional paths for circulation of cooling fluid adjacent the sides of the brush. This additional cooling flow may be supplied by a pressurized source, not shown, connected to port 90 in the brush holder.

As has been shown and described, the present invention comprises a novel, commutator-brush assembly particularly well suited for use with high speed direct current machinery. The apparatus disclosed has the particularly advantageous features of a commutator which does not buckle or warp when subjected to elevated temperatures or high centrifugal forces. Also, due to its face-plate type configuration, the commutator can be machined to provide a smooth surface after its assembly thereby virtually eliminating irregularities which cause brush bounce. Loaded against the aforementioned novel commutator assembly is a brush assembly comprising brushes which are held and loaded against the commutator in such a manner that rotation of the brushes can not occur, constant pressure against the commutator results regardless of brush wear and the effects of brush bounce or chattering are minimized. The brush assembly is also provided with means for cooling the brushes themselves thus resulting in longer brush life.

While a preferred embodiment of the present invention has been shown and described, various substitutions and modifications may be made to the disclosed embodiment without departing from the spirit and scope of this invention. For example, either the brushes or commutator may be used independently and/or in an environment different from that described. Accordingly, it is to be understood that this invention has been described by way of illustration and not limitation.

What is claimed is:

1. Apparatus for establishing a conductive path to the rotating part of a high speed direct current machine comprising:
   rotatable support means coaxial with the axis of rotation of the machine;
   a plurality of commutator segments;
   means for securing first ends of said segments to said support means to define a face-plate commutator coaxial with said machine axis of rotation, said first ends of said segments being disposed radially inwardly of the other ends of said segments and defining the inner diameter of the commutator; and
   restraining means for holding said other ends of said segments against said support means, said restraining means and support means cooperating to define an annular space about the periphery of the commutator whereby radially outward expansion of said segments is permitted, axial movement of said segments being prevented by said restraining and support means.

2. Apparatus for establishing a conductive path to the rotating part of a high speed direct current machine comprising:
   a plurality of commutator segments;
   rotatable support means;
   means for securing first ends of said segments to said support means;
   restraining means for holding the opposite ends of said segments against said support means, said restraining means allowing radial expansion of said segments;
   a plurality of electrically conductive brushes, the commutator contacting end of said brushes and at least a portion of the brushes adjacent thereto being generally wedge shaped, said brushes each having a passage at least part way therethrough for the flow of a coolant, said passages communicating with the commutator contacting ends of the brushes;
   a plurality of brush holders, said brush holders having at least a portion generally commensurate in shape with the wedge shaped portion of the brushes, said brushes each being positioned in a respective brush holder, said holders and brushes cooperating to define at least a first pair of passages for the flow of coolant about the exterior of the brushes;
   a flexible member in each of said brush holders, said flexible members dividing said brush holders into two portions, said flexible members supporting the other ends of said brushes which are disposed away from the commutators; and
   means for supplying fluid under pressure to those portions of said brush holders defined by said flexible members and lying to the rear of said other ends of said brushes.

3. The apparatus of claim 1 further comprising:
   means for insulating said segments one from the other and from the support means.

4. The apparatus of claim 3 wherein said commutator segments are wedge shaped and have inwardly extending retaining feet.

5. The apparatus of claim 4 wherein said supporting means includes an annular recess complementary in shape to the retaining feet on said commutator segments.

6. The apparatus of claim 5 wherein said foot on each of said commutator segments has a sloped wedging surface, said securing means causing said sloped surface to cooperate with said complementary shaped annular recess to draw said segments inwardly against said support means and toward the axis of rotation thereof.

7. The apparatus of claim 1 wherein said restraining means comprises:
   a retaining plate which engages the commutator segments; and
   means for attaching said retaining plate to said support means.

8. The apparatus of claim 3 wherein said commutator segments have an inwardly extending lip at the outer edge thereof and wherein said restraining means comprises:
   a retaining plate which engages said lip in said commutator segments, the surface of said plate lying in a plane which does not extend above the plane defined by the brush contacting surfaces of said segments; and
   means for attaching said retaining plate to said support means.

9. The apparatus of claim 6 wherein said commutator segments have an inwardly extending lip at the outer edge thereof and wherein said restraining means comprises:

a retaining plate which engages said lip in said commutator segments, the surface of said plate lying in a plane which does not extend above the plane defined by the brush contacting surfaces of said segments; and means for attaching said retaining plate to said support means.

10. The apparatus of claim 9 further comprising:

brush means in contact with the exposed surface of said commutator segments, said brush means comprising a plurality of brushes which individually and simultaneously contact a plurality of commutator segments, the contacting face of said brushes being commensurate in shape with the shape of the individual commutator segments.

11. The apparatus of claim 10 wherein said brush means comprises:

a plurality of brush supports;

a brush positioned in each of said supports;

a diaphragm in each of said supports, said diaphragms supporting the end of the brush disposed away from the commutator; and means for supplying fluid under pressure to said brush supports at a point rearwardly of said diaphragm whereby said diaphragm acts on said brushes to load the brushes against the surface of the commutator.

12. The apparatus of claim 10 wherein said brush means comprises:

a plurality of brush supports;

a brush positioned in each of said brush supports, said brushes having means therein to permit the flow of cooling fluid therethrough.

13. The apparatus of claim 10 wherein said brush means comprises:

a plurality of electrically conductive brushes, the commutator contacting end of said brushes and at least a portion of the brushes adjacent thereto being generally wedge shaped, said brushes each having a passage at least part way therethrough for the flow of a coolant, said passages communicating with the commutator contacting ends of the brushes;

a plurality of brush holders, said brush holders having at least a portion generally commensurate in shape with the wedge shaped portion of the brushes, said brushes each being positioned in a respective brush holder, said holders and brushes cooperating to define at least a first pair of passages for the flow of coolant about the exterior of the brushes;

a flexible member in each of said brush holders, said flexible members dividing said brush holders into two portions, said flexible members supporting the other ends of said brushes which are disposed away from the commutators; and means for supplying fluid under pressure to those portions of said brush holders defined by said flexible members and lying to the rear of said other ends of said brushes.

References Cited

UNITED STATES PATENTS

| | | | |
|---|---|---|---|
| 485,669 | 11/1892 | Thomson | 310—237 |
| 489,000 | 1/1893 | Groswith et al. | 310—237 |
| 738,478 | 9/1903 | Phillips | 310—248 |
| 884,049 | 4/1908 | Speirs | 310—243 |
| 3,354,332 | 11/1967 | Bonnefoy | 310—268 |

WARREN E. RAY, Primary Examiner

L. A. ROUSE, Assistant Examiner

U.S. Cl. X.R.

310—243